United States Patent
Xu et al.

(10) Patent No.: US 8,849,013 B2
(45) Date of Patent: Sep. 30, 2014

(54) SYSTEM AND METHOD OF IMAGE PROCESSING

(75) Inventors: Jin Xu, Singapore (SG); Chao Hsu Lee, Singapore (SG); Jian Zhang, Singapore (SG); Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 13/105,116

(22) Filed: May 11, 2011

(65) Prior Publication Data

US 2012/0114224 A1 May 10, 2012

(30) Foreign Application Priority Data

May 20, 2010 (SG) ................ 201003566.5

(51) Int. Cl.
*G06K 9/00* (2006.01)
*G06K 9/32* (2006.01)
*H04N 13/00* (2006.01)
*G06T 7/00* (2006.01)
*H04N 13/02* (2006.01)
*G06T 15/20* (2011.01)

(52) U.S. Cl.
CPC .......... *G06T 7/0022* (2013.01); *H04N 13/0011* (2013.01); *G06T 7/0028* (2013.01); *H04N 13/0282* (2013.01); *G06T 2207/10012* (2013.01); *G06T 2207/20228* (2013.01); *G06T 15/205* (2013.01)
USPC ............................. 382/154; 382/276; 382/300

(58) Field of Classification Search
USPC .......................... 382/154, 276–308
See application file for complete search history.

(56) References Cited

U.S. PATENT DOCUMENTS

| 5,148,499 | A  | * | 9/1992 | Matsumura ................... 382/131 |
| 5,613,048 | A  |   | 3/1997 | Chen et al. |
| 6,263,100 | B1 |   | 7/2001 | Oshino et al. |
| 2006/0115176 | A1 | | 6/2006 | Kanamori et al. |

OTHER PUBLICATIONS

Singapore Examination Report issued Sep. 21, 2012 in connection with Singaporean Application No. 201003566.
Farin, View Interpolation Along a Chain of Weakly Calibrated Cameras. Univ. Technol. Eindhoven, Jan. 1, 2006; http://vca.ele.tue.nl/publications/data/Farin2006d.pdf. Last accessed on Jan. 25, 2012.
Loop et al., Computing rectifying homographies for stereo vision. Proceedings of the 1999 IEEE Computer Society Conference on Computer Vision and Pattern Recognition, Jun. 23, 1999;1:125-131.

(Continued)

*Primary Examiner* — Brian Le
(74) *Attorney, Agent, or Firm* — Wolf, Greenfield & Sacks, P.C.

(57) ABSTRACT

A method of image processing comprising receiving a plurality of interpolated images, interpolated from two adjacent camera positions having different image planes, applying a transformation to each interpolated image to a respective one of a plurality intermediate image planes, wherein each intermediate image plane is oriented intermediate to the image planes of the two adjacent camera positions depending on a viewing angle of that interpolated image relative to the adjacent camera positions. Also an integrated circuit or processor, an apparatus for capturing images and an apparatus for displaying images.

28 Claims, 9 Drawing Sheets

(7 of 9 Drawing Sheet(s) Filed in Color)

(56) References Cited

OTHER PUBLICATIONS

Seitz, View Morrphing: Uniquely Predicting Scene Appearance from Basis Images. Proceedings of the Image Understanding Workshop, Jan. 1, 1997;881-887, http://www.ri.cmu.edu/pub_files/publ/seitz_steven_1997_5.pdf, retrieved Jan. 25, 2012.

Xiao et al., Tri-view morphing. Computer Vision and Image Understanding. Academic Press, Dec. 1, 2004;96(3):345-366.

Yuyu Liu, Yamaoka, K., Sato, H., Nakamura, A., Iwai, Y., Ooi, K., Weiguo Wu, and Yoshigahara, T., "Eye-contact visual communication with virtual view synthesis", *Proceedings of IEEE Consumer Communications and Networking Conference, 2005 (CCNC 2005)*, pp. 235-240.

R. I. Hartley "Theory and Practice of Projective Rectification", *Int. Journal of Computer Vision*, 35, pp. 115-127, 1999.

Kubota, A., Aizawa, K. and Chen, T., "Virtual View Synthesis through Linear Processing without Geometry", *International Conference on Image Processing 2004*, pp. 3009-3012, vol. 5.

Kubota, A., Kodama, K., and Hatori, Y., "Deconvolution Method for View Interpolation Using Multiple Images of Circular Camera Array", *International Conference on Image Processing, 2006*, pp. 1049-1052.

Dirk Farin, Yannick Morvan, Peter H. N. de With, "View Interpolation Along a Chain of Weakly Calibrated Cameras", *IEEE Workshop on Content Generation and Coding for 3D-Television*, Jun. 2006, Eindhoven, Netherlands.

\* cited by examiner

SYSTEM AND METHOD OF IMAGE PROCESSING

FIELD

The invention relates to a system and method of image processing.

BACKGROUND

The display of 3D imagery can be created from a number of views of a camera subject taken from different angles. Often the captured images are from a limited number of camera positions so it may be necessary to interpolate between the capture images to give the impression of true 3D across the range of viewing angles.

Figure 15A:
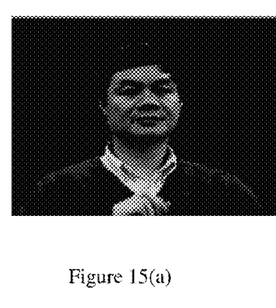
Figure 15B:
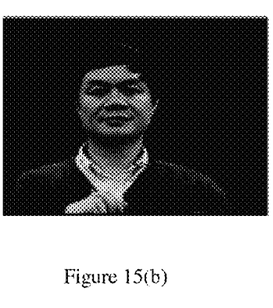
Figure 15C:
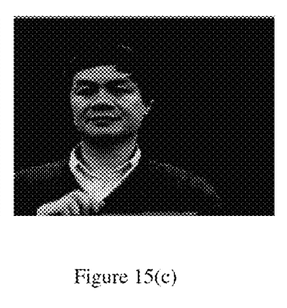

Traditional view interpolation uses a single pair of cameras with a short baseline. One common application for view interpolation is in gaze control for tele-conferencing systems with a camera setup such as that illustrated in FIG. 2a. FIGS. 15(a), 15(b) and 15(c) show the interpolated results of such a camera setup. FIG. 15(a) is the view taken from a right webcam and FIG. 15(c) is the view taken from a left webcam. FIG. 15(b) is the interpolated view.

Figure 14:
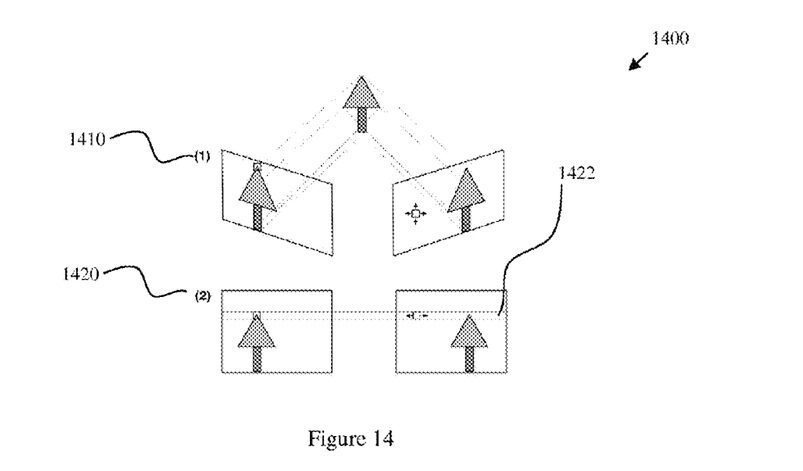
FIG. 14 is a schematic drawing of a rectification of images to a common image plane.

In view interpolation applications, normally a rectification process is required to make use of the epi-polar constraint in the stereo matching process. The rectification can be done based on a one-time calibration when the positions of the cameras' position are fixed, or with some image processing method (e.g. feature point detection and matching) when calibration is not feasible such as described in R. I. Hartley "Theory and Practice of Projective Rectification". *Int Journal of Computer Vision* 35: 115-127. 1999. The purpose of rectification is to transform the two input images onto a common image plane where the matching is constraint within the same line between two input images as illustrated in FIG. 14.

Figure 2A:
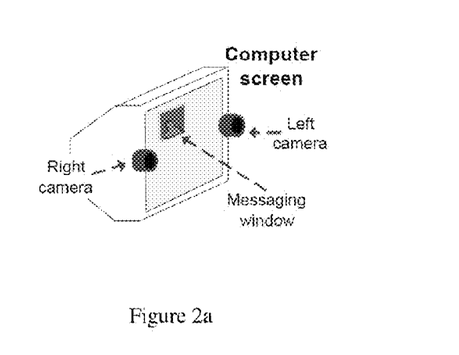
FIG. 2*a* is a schematic drawing of hardware for a teleconference system.

Matching and interpolation is then consequently done in this common image plane after the rectification process and the result can be directly shown as the output. No post processing may be necessary for such a setup as shown in FIG. 2a.

Figure 2B:
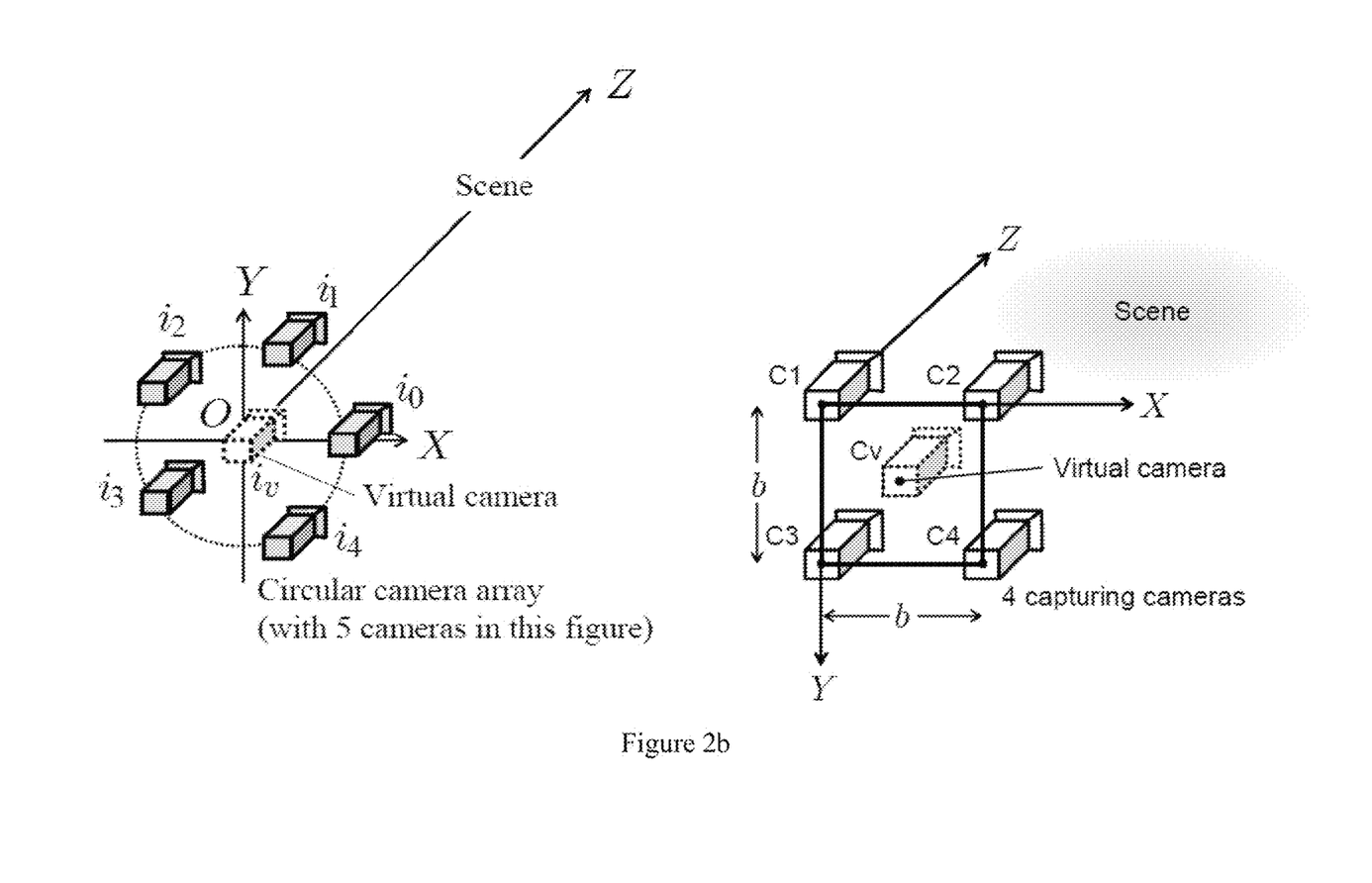
FIG. 2*b* is a schematic drawing of a square and circular array of cameras.

View interpolation can also be applied to the output from a camera array with more than two cameras to cover larger viewing zones. FIG. 2b shows two examples of camera arrays with more than two cameras. In these two setups, all the cameras are parallel and the image planes can be considered to coincide with each other. Thus post processing may not be necessary. If however the image planes of all the cameras do not coincide, then post processing may become necessary.

Figure 3:
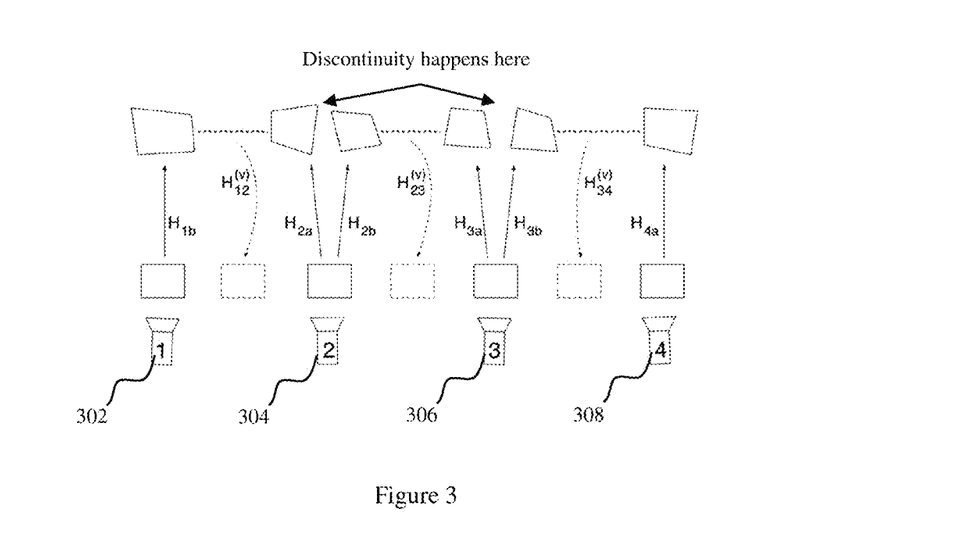
FIG. 3 is a photograph of an example of discontinuity in results of two adjacent camera pairs.

In setups with more than two cameras and where the image planes do not coincide, a problem arises when the interpolated views move across the boundary of each pair, as is illustrated in FIG. 3. This is because rectification can only be done between a pair of cameras. For such cases, post processing is needed to create a continuous viewing effect for the full set of interpolated results from different camera pairs.

Figure 10A:
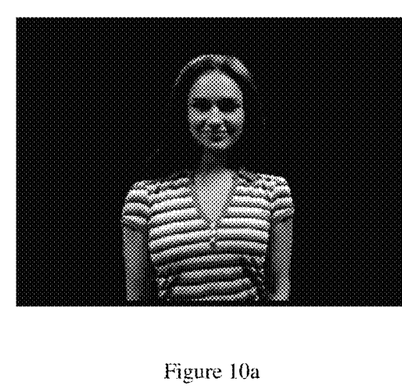
FIG. 10*a* is a photograph of a right most interpolated image of a pair of cameras showing an example of discontinuity in results of two adjacent camera pairs.
Figure 10B:
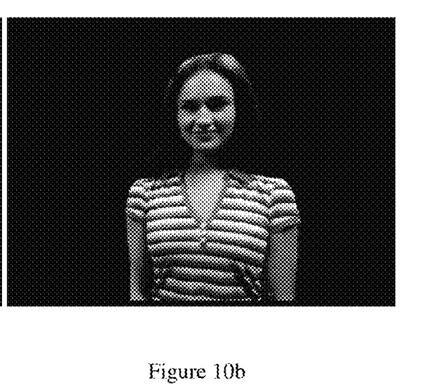
FIG. 10*b* is a photograph of a left most interpolated image of an adjacent pair of cameras showing the example of discontinuity in results of two adjacent camera pairs.

Without post processing, pair-to-pair jumping effects exist at the boundaries illustrated in FIG. 3. FIG. 10 shows the abrupt change between one image to the next at the boundary. When viewed on a 3D display, this discontinuity effect in the interpolated results may cause unnatural abrupt changes when the viewer is moving around the display.

Figure 1:
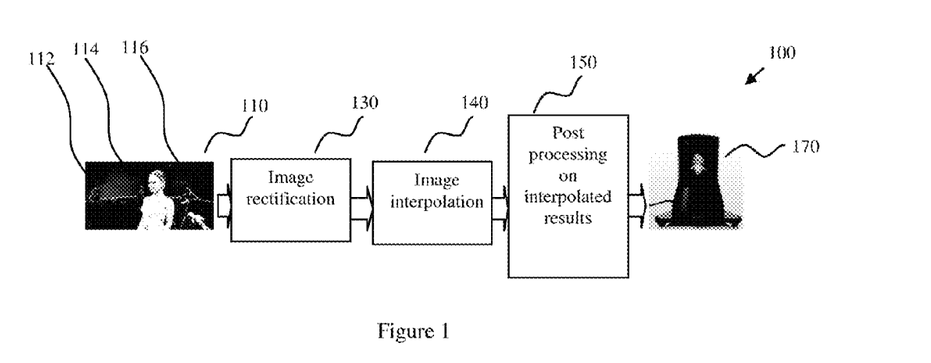
FIG. 1 is a schematic drawing of a system for image acquisition, interpolation and display.

Another unnatural effect of the interpolated results may be the incorrect keystone when viewed around the RayModeller image display system 170 that is illustrated in FIG. 1. Again, this is caused by the fact that all the interpolated view images are on the same rectified image plane and the keystone is incorrect for different viewing angles.

In Dirk Farin, Yannick Morvan, Peter H. N. de With, "View Interpolation Along a Chain of Weakly Calibrated Cameras" *IEEE Workshop on Content Generation and Coding for 3D-Television*, June 2006, Eindhoven, Netherlands post processing calling "un-rectification" is proposed. The idea is to undo the "rectification" for each interpolated views to generate physically valid viewing effect. At the borders of camera pairs, the "un-rectified" results coincide with the original camera images thus the discontinuity problem is solved.

Transformations between the original images and the rectified images for the extreme views are known from the image-rectification process. However, the transformation for the interpolation results between these transformations is not available. Hence, interpolation between the two transformations for the two extreme views might be done in order to obtain a visually sensible motion. Simple interpolation of the transformation matrices $H_{(i)b}$, $H_{(i+1)a}$ may lead to unnatural or even invalid transformations (mapping part of the image to infinity). As an alternative approach, the motion of the four corners of the rectified images may be used as references. The positions of these four corners are linearly interpolated and the intermediate transformation $H_{i(i+1)}^{(v)}$ is determined as the transformation that maps these four corners to the screen corners.

Although this alternative method can generate visually continuous results, it may not be accurate and it may be complex. The assumption of linear movement of four corners may be invalid generally and the error may become visible when the change in viewing position and direction between the two cameras is big. Also, the algorithm may be complex as user input of scene corners is needed and additional estimation step based on the four corner positions is needed.

SUMMARY

In general terms in a first aspect the invention relates to "un-rectification" of the interpolated results to bring them to different image planes according to the viewing angle. This may have the advantage that image planes of intermediate results transit smoothly according to the viewing angle, which may create a more natural and physically valid viewing effect.

In one or more embodiments, interpolated images from multiple camera pairs can be seamed together without the discontinuity problem. Correct keystone and size compensation may be achieved at the same time for the intermediate results.

One or more embodiments may permit image interpolation to be used for the creation of special effects such as the "bullet time" effect used in the Matrix movie. Fewer cameras may be needed when creating a special effect, or when creating a 3D view, and a more flexible viewing effect may also be created.

One or more embodiments may involve simple matrix calculation and may be implemented using a personal computer, an embedded device or consumer electronics product.

One or more embodiments may be used for generating data such as images, 3D models or image textures for various 3D display platforms.

In a second aspect the invention relates to baseline adjustment. This may have the advantage that for linear camera setups, post processing can be much simplified.

In a first specific expression of the invention there is provided a method of image processing as claimed in claim 1 or 18.

In a second specific expression of the invention there is provided an integrated circuit or processor as claimed in claim 21.

In a third specific expression of the invention there is provided an apparatus for capturing images as claimed in claim 22.

In a forth specific expression of the invention there is provided an apparatus for displaying images as claimed in claim 23.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order that the invention may be fully understood and readily put into practical effect there shall now be described by way of non-limitative example only, an example embodiment described below with reference to the accompanying illustrative drawings in which:

FIG. 15(*a*) is a photograph of an image from a right camera of a conventional view interpolation between a pair of cameras;

FIG. 15(*b*) is a photograph of an interpolated virtual view of the conventional view interpolation between the pair of cameras;

FIG. 15(*c*) is a photograph of an image from a left camera of the conventional view interpolation between the pair of cameras and FIG. 16 is the interpolated images in between a pair of cameras after post-processing.

DETAILED DESCRIPTION

FIG. 1 shows a system 100 for image acquisition, rectification, interpolation, post processing and display according to an example embodiment. The system 100 comprises an image acquisition system 110, an image rectification system 130, an image interpolation system 140, post processing 150 and an image display system 170.

The image acquisition system 110 comprises a plurality of cameras 112, 114, 116 which are positioned at a plurality of different camera positions or views. The image acquisition system 110 acquires a plurality of images from the plurality of cameras 112, 114, 116. The plurality of images is then provided to image interpolation the image processing system 150.

Figure 2C:
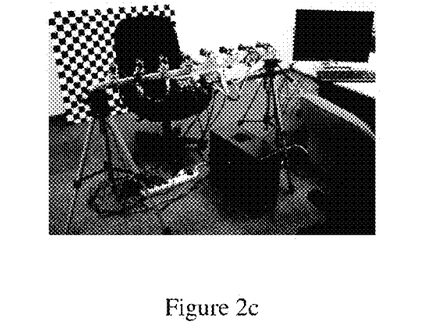
FIG. 2*c* is a photograph of a camera array with a straight track setup.
Figure 2D:
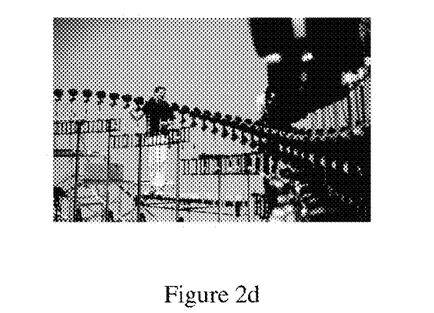
FIG. 2*d* is a photograph of a camera array used for the production of movies.

The image acquisition system 110 can take the form of a circular setup as illustrated in FIG. 1. In an alternative embodiment, the image acquisition system 110 can take the form of hardware for a teleconference system as illustrated in FIG. 2*a*. The image acquisition system 110 can also take the form of camera arrays with more than two cameras such as those illustrated in FIG. 2*b*. The image acquisition system 110 alternatively can take the form of a linear, inward looking straight track setup as illustrated in FIG. 2*c* and which can be used for ray reconstruction for a 3D display. In another alternative embodiment, the image acquisition system 110 can take the form of a camera array as illustrated in FIG. 2*d* which is used in movie productions e.g. in the production of The Matrix. In yet another alternative embodiment, the image acquisition system 110 can instead comprise a single camera taking a plurality of images from a plurality of different camera positions or views. The cameras used may be handheld cameras, mounted cameras, portable video cameras, mobile phone cameras, web-cameras or surveillance cameras. The cameras used can also be either progressive scanning or interlace scanning.

Figure 4:
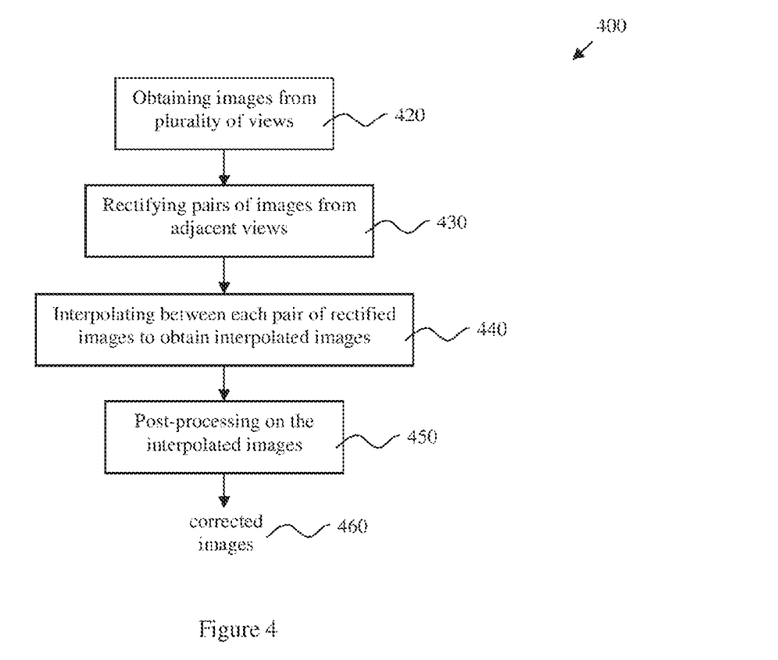
FIG. 4 is an illustration of a method of image interpolation.

The image rectification system 130 receives as an input the plurality of images from the image acquisition system 110. The image rectification system 130, image interpolation system 140 and image processing system 150 carry out a method 400 of image processing as shown in FIG. 4, which will be described to a greater detail later. The result of the image post processing system 150 is a plurality of "un-rectified" images.

It would be understood by a skilled person that the image processing system 150 can be implemented as a piece of software on a single personal computer, or realized in an embedded hardware form as an FPGA (Field Programmable Gates Array), or be implemented across multiple computers and/or embedded devices, or it could be implemented using a System-on-chip (SOC) solution. For example, it may be implemented within a video camera used to capture the images or in a display or player used to display the images The image display system 170 then displays the plurality of "un-rectified" images produced by the image processing system 150. The image display system 170 can take the form of a 3D display such as the Sony® RayModeller™ developed by Sony and released at the Digital Contents Expo 2009, which is illustrated in FIG. 1. The RayModeller has a cylindrical concept design that can be viewed from all angles, thus providing 360-degree viewing. The RayModeller is about 10.6- inches tall and about 5.1-inches in diameter, and glasses are not needed to view the 3D effect.

Alternatively, the image display system 170 can also be a computer monitor, a television or a projector.

The method 400 according to the present embodiment includes the algorithm implemented in the image rectification system 130, image interpolation system 140 and image processing system 150 to process the images.

In 420, a plurality of images are obtained from the plurality of camera positions or views. This plurality of images may be obtained from an image acquisition system 110 such as that illustrated in FIG. 1.

In 430, rectification is performed between pairs of images from adjacent views. Rectification permits the use of the epi-polar constraint in the stereo matching process. The purpose of rectification is thus to transform the pair of images onto a common image plane, as is illustrated in FIG. 14.

This can be done for images from the i and (i+1) camera positions by applying a rectification matrix $H_{(i)b}$ to the image taken from the i camera position and $H_{(i+1)a}$ to the image taken from the (i+1)-th camera position.

$H_{(i)a}$ is the rectification matrix for the i-th camera in the pair made of (i−1)-th and i-th cameras, while $H_{(i)b}$ is the rectification matrix for the i-th camera in the pair made of i-th and (i+1)-th cameras. In most cases $H_{(i)a} \neq H_{(i)b}$.

The images before rectification 1410 have different image planes and the images resulting from rectification 1420 have a common image plane. Matching is constrained within the same line 1422 across both images.

The rectification 430 can be performed using any method of image rectification that is known in the art. For example, the rectification can be done based using information obtained in a one-time calibration if the camera positions are fixed, or with some image processing method (e.g. using feature point detection and matching) when calibration is not feasible.

View interpolation 440 is then performed on the pairs of images after the images are rectified. This can be done using any interpolation method that is known in the art. For example, the interpolation can be done using dynamic programming matching such as that done in Yuyu Liu, Yamaoka, K., Sato, H., Nakamura, A., Iwai, Y., Ooi, K., Weiguo Wu, and Yoshigahara, T. Eye-contact visual communication with virtual view synthesis. *Proceedings of IEEE Consumer Communications and Networking Conference,* 2005 (*CCNC* 2005). Page: 235-240).

Figure 7:
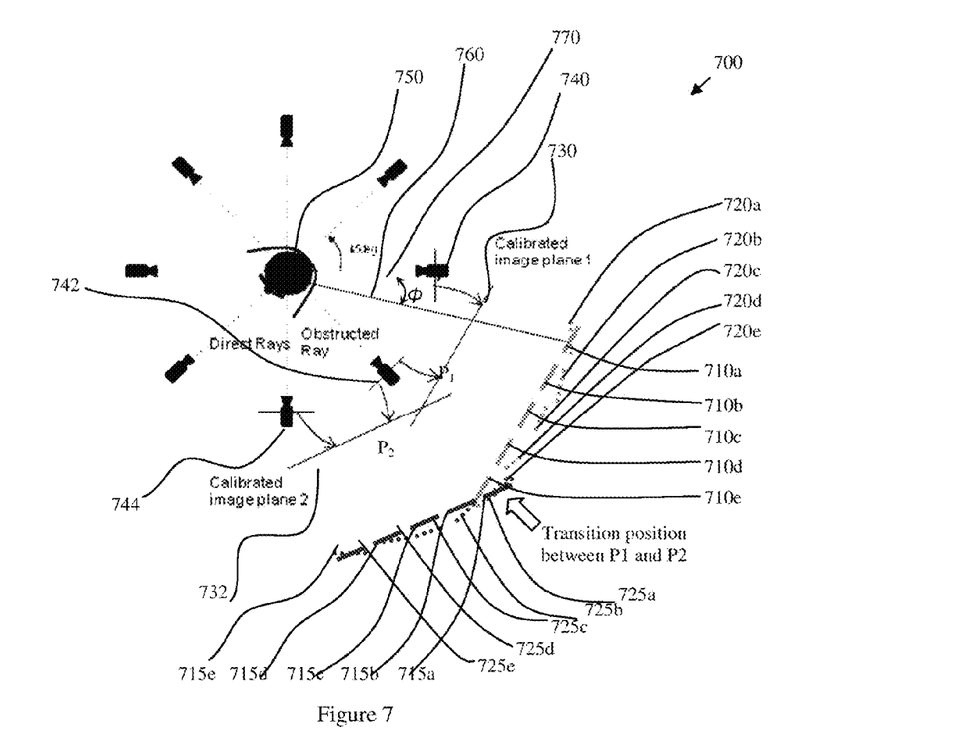
FIG. 7 is a schematic drawing of a plurality of interpolated images before and after performing post-processing.

FIG. 7 shows the interpolated images 710a to 710e from view interpolation 440 of the camera position pair $P_1$ consisting of camera positions 740 and 742. Also, the interpolated images 715a to 715e are from view interpolation 440 of the camera position pair $P_2$ consisting of camera positions 742 and 744. It can be seen that the interpolated images 710a to 710e are on a different plane from the interpolated images 715a to 715e i.e. the planes 730 and 732 respectively.

In 450, post-processing is then performed on the interpolated images. The post-processing step is illustrated to a greater detail in FIG. 5 and produces a plurality of "un-rectified" images.

In 460, the corrected images resulting from post-processing are then available for display using an image display system 170 such as that illustrated in FIG. 1.

Figure 5:
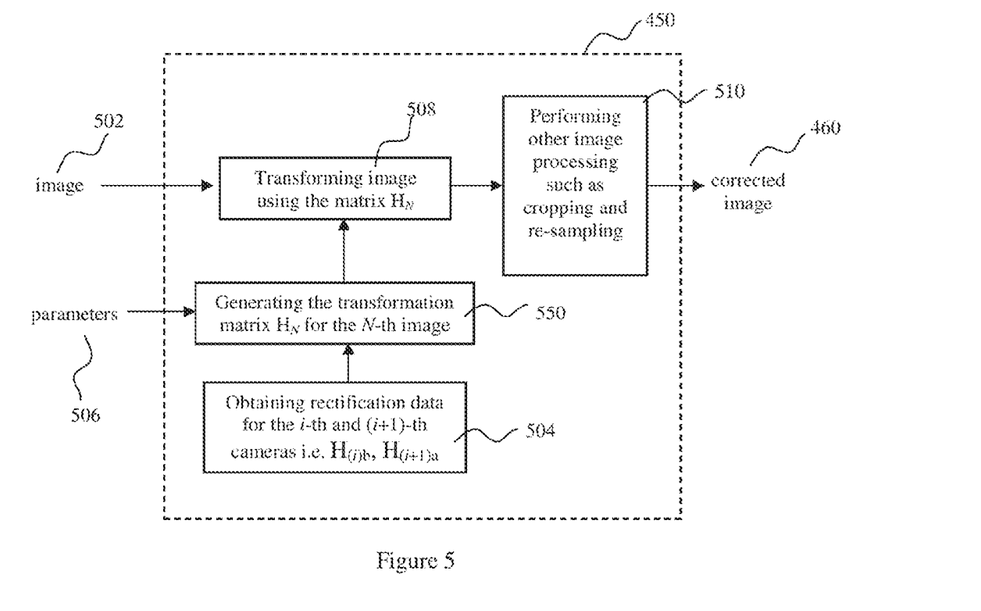
FIG. 5 is an illustration of a method of post-processing an interpolated image.

The post-processing 450 of the interpolated images in the post processing system 150 will be described with the aid of FIG. 5. Post-processing 450 results in "un-rectification" of each interpolated image N onto an image plane corresponding to the viewing angle. The viewing angle for an interpolated image N is the angular position about a camera subject 750 of a virtual camera position corresponding to the interpolated image N. Taking the "un-rectified" interpolated image 720a as an example, the viewing angle can be indicated by φ i.e. the angle between the radial line 760 extending from the centre of the camera subject 750 to the center of the "un-rectified" interpolated image 720a, and the radial line 770 extending from the center of the camera subject 750 to the camera position 740.

N is an index of the interpolated images resulting from a pair of camera positions. Assuming that there are a total of M images in the set of interpolated images from the i and (i+1) camera positions, then the post-processing 450 may be applied to each interpolated images N in the set consisting of 1≤N≤M.

First, the interpolated image N 502 is provided. In 504, the rectification data for the i and i camera positions are obtained as $H_{(i)b}$ and $H_{(i+1)a}$ respectively. The parameters 506 for the interpolated image 502 are then provided. These parameters 506 include those relating to the N view position e.g. the value of N. In 550, the transformation matrix $H_N$ for the interpolated image N is generated from $H_{(i)b}$, $H_{(i+1)a}$ and the parameters 506. The details of the generation step 550 will be described later with the aid of FIG. 6.

In 508, the transformation matrix $H_N$ that is generated is then applied to the interpolated image 502. In 510, the interpolated image 502 with $H_N$ applied may then be subjected to other image processing steps such as cropping or re-sampling. Cropping and re-sampling are optional. There are two reasons why these steps processing may be needed: 1) different camera have different field of view, thus it's better to crop the image so the result only contains the common area visible to all cameras; 2) further cropping or re-sampling may be needed to fit the images size to the display. For example, the camera resolution may be 800×600, but the display resolution may be only 128×128.

After "un-rectification", different amounts of transformation corresponding to the different viewing angles will be applied to each of the interpolated images. The first and final "un-rectified" images (i.e. 720e and 725a) of the two adjacent groups of "un-rectified" images 720a to 720e and 725a to 725e will have image planes identical to the image plane for the camera position 742 that is the boundary of two image groups and has the correct keystone and size factor as it's obtained from a real camera. The viewing of the transition between the "un-rectified" interpolation images from adjacent pairs such as e.g. $P_1$ and $P_2$ will be smooth as the image planes of the "un-rectified" images will have a smooth viewing angle transition, thus creating a natural and physically valid viewing effect.

Figure 6:
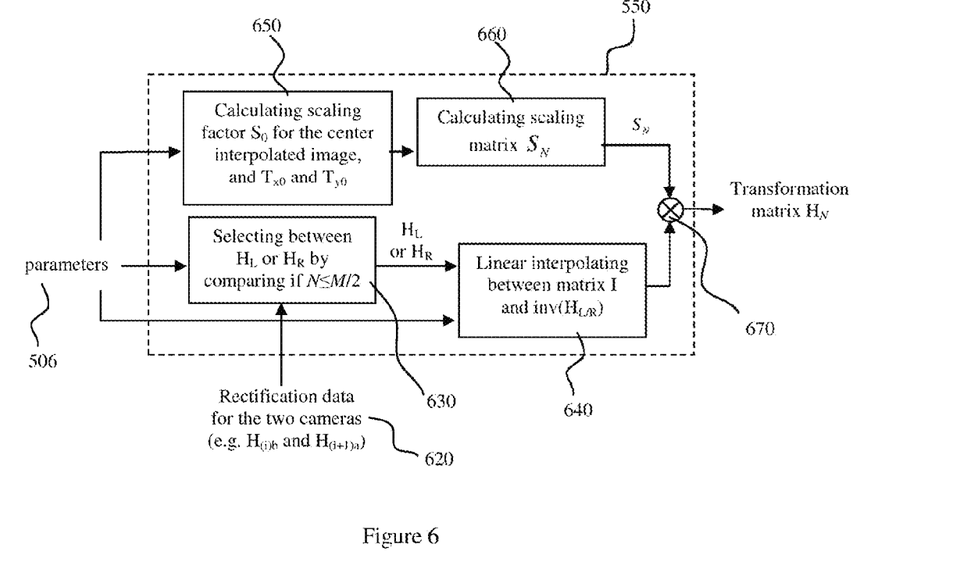
FIG. 6 is an illustration of a method of calculation of a transformation matrix for the interpolated image.

The generation 550 of the transformation matrix $H_N$ will be described with the aid of FIG. 6. The rectification transformations between the original images and the rectified images for the extreme views where N=1 and N=M are known from the image rectification process. However, the transformation for the interpolated images between these transformations will have to be calculated.

The parameters 506 for the interpolated image 502 are first provided. Also, the rectification data 620 for the i and (i+1) camera positions are obtained as $H_{(i)b}$ and $H_{(i+1)a}$ respectively in 504. Let $H_{(i)b}$ be $H_L$ and $H_{(i+1)a}$ be $H_R$. It is noted that $H_L$ and $H_R$ respectively are thus "rectification" matrices associated with the i and (i+1) camera positions and can be obtained from the camera calibration data.

In 630, a decision is made to choose either Equation 1 or 2 for computing the keystone compensation matrix $K_N$. If $$N \le \frac{M}{2},$$

then Equation 1 is the chosen equation.

$$K_N = (H_R^{-1} \cdot \beta + I \cdot (1-\beta)) \quad (1)$$

Otherwise, Equation 2 is the chosen equation.

$$K_N = (H_L^{-1} \cdot \alpha + I \cdot (1-\alpha)) \quad (2)$$

$H_L^{-1}$ and $H_R^{-1}$ denote the inverse of $H_L$ and $H_R$ respectively and I denotes an identity matrix. $\alpha$ and $\beta$ are the linear interpolation coefficients determined by the camera position. S is a scaling matrix denoting an additional transformation to compensate for size factor and the shift of image centres.

Figure 8:
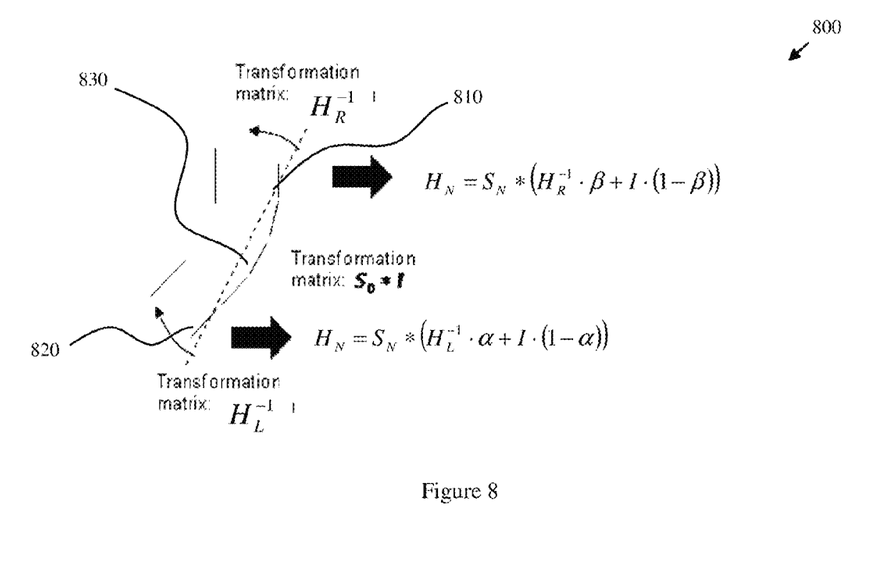
FIG. 8 is a schematic drawing of a calculation of the transformation matrix for the method of post-processing.

In 640, the keystone compensation matrix $K_N$ is found using the chosen equation by interpolating between either of $H_L^{-1}$ (if the chosen equation is Equation 2) or $H_R^{-1}$ (if the chosen equation is Equation 1), and an identity matrix I. This is illustrated in FIG. 8 where 810 is the image at one end of the series where N=1, and 820 is the image at the other end of the series where N=M. 830 is the interpolated image at the center of the series where $$N = N = \frac{M}{2}.$$

The transformation matrices for images 810 and 820 at the ends of the series of M interpolated images are just the inverse of the "rectification" matrices for the two cameras (i.e. $H_L$ and $H_R$) and no transformation (i.e. the transformation matrix is an identity transformation matrix) is needed for the result at the center for keystone compensation (however, size compensation of the camera subject in the image for the change of viewing distance may still be needed as illustrated in FIG. 7). The distance from the image plane to the object has been changed. Thus the image size of the same object needs to be changed. Otherwise, the object will seems to be changing its size when viewed from different angles on the 3D display. This is based on the assumption that the two camera image planes are symmetric with regard to the rectified image plane. This assumption is reasonable for most case of setups where the object of interest is kept at the center of all camera images and has been verified experimentally.

The interpolation method of Equation 1 and Equation 2 always generates continuous, feasible transformations. This is as opposed to the case in some prior art where interpolation is carried out between $H_L$ and $H_R$.

In 650, the scaling factor $s_0$ for the centre interpolated image 830 is calculated. The scaling factor $s_0$ is used to compensate for differences in the sizes of the camera subject 750 across the series of M interpolated images. For a camera setup with a known geometry setup, $s_0$ can be simply calculated using the viewing distance d as $$s_0 = \frac{d}{R} \quad (3)$$

or $$s_0 = \frac{\cos\alpha}{2} \quad (4)$$

R is a line extending from an edge of the centre interpolated image 830 to the object of interest and $\alpha$ is an angle indicating the field of view of the centre interpolated image.

For cases where information about the geometry is not available, the value of $s_0$ can be estimated in a trial-and-error method.

After obtaining the value of $s_0$, $T_{x0}$ and $T_{y0}$ can be calculated as $$T_{x0} = \frac{DW}{2} \cdot (s_0 - 1) \quad (5)$$

and $$T_{y0} = \frac{DH}{2} \cdot (s_0 - 1) \quad (6)$$

where DW is the width of the centre interpolated image 830 and DH is the height of the centre interpolated image 830 in number of pixels. $T_{x0}$ and $T_{y0}$ respectively are the translation of image origin horizontally and vertically in number of pixels.

In 660, the scaling matrix $S_N$ is determined. Specifically, at the center viewing position, $$S_N = S_0 = \begin{bmatrix} 1 & 0 & T_{x0} \\ 0 & 1 & T_{y0} \\ 0 & 0 & s_0 \end{bmatrix} \quad (7)$$

For intermediate viewing positions, $$S_N = \begin{bmatrix} 1 & 0 & T_x \\ 0 & 1 & T_y \\ 0 & 0 & s \end{bmatrix} \quad (8)$$

Figure 9:
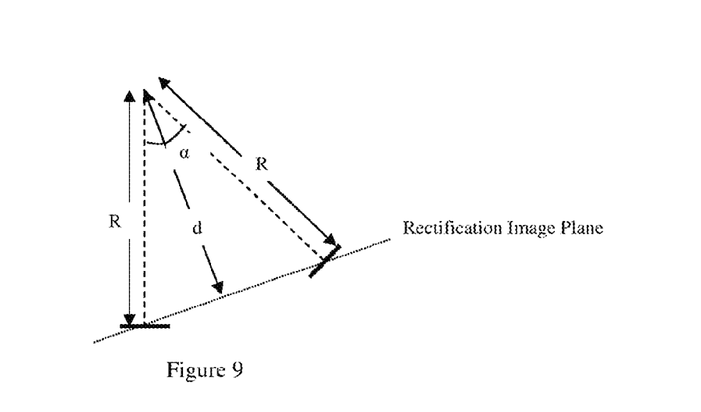
FIG. 9 is a schematic drawing of a changing viewing distance along a rectification plane.

$T_x$, $T_y$ and s can be obtained by interpolation between an identical matrix and $S_0$. The size factor denoted by s compensates the changes in viewing distance along the position on the "rectification plane" with regard to the viewing object as illustrated in FIG. 9. Translation of the image origins using $T_x$ and $T_y$ keeps the viewing object at the centre of the resultant images after undergoing the "un-rectification" process. It is noted that the $S_N$ of the camera positions at the ends of the series of interpolated images i.e. where N=1 or N=M are identity matrices, while the keystone compensation matrix $K_N$ is an identity matrix at the centre of the series In 670, the transformation matrix $H_N$ is obtained using the matrices $S_N$ and $K_N$ $$H_N = S_N * K_N \quad (9)$$

* denotes a matrix multiplication.

The transformation matrix $H_N$ can then be applied to the interpolated image N 502.

Figure 11A:
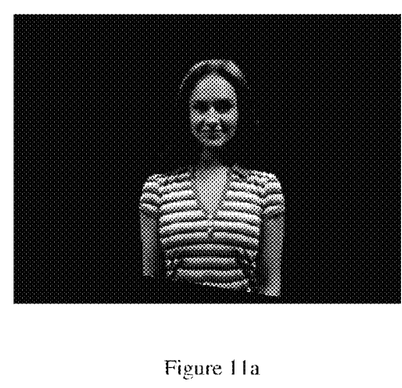
FIG. 11*a* is a photograph of a right most interpolated image of a pair of cameras after post-processing.
Figure 11B:
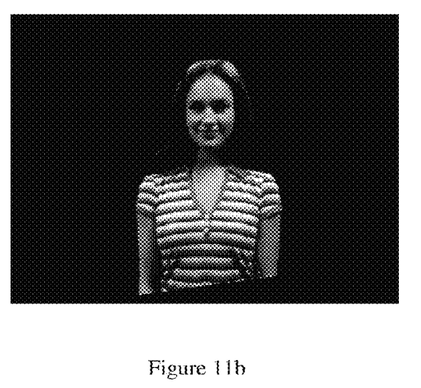
FIG. 11*b* is a photograph of a left most interpolated image of an adjacent pair of cameras after post-processing.
Figure 16:
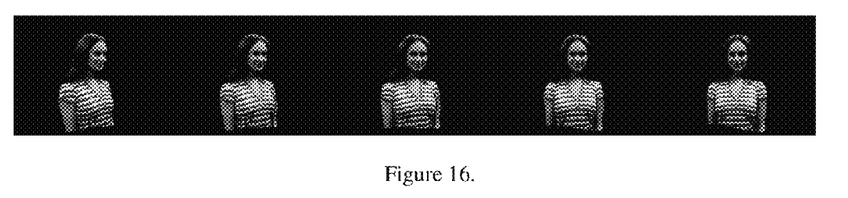

FIG. 11 shows the results after the "un-rectification" matrix H had been applied to the results shown in FIG. 10. It can be seen that the commonly visible image areas are now geometrically identical without any distortion. This simple matrix interpolation method also works well for the intermediate results as shown in FIG. 16 to generate smooth and physically valid viewing effects as verified on RayModeller display.

Figure 12:
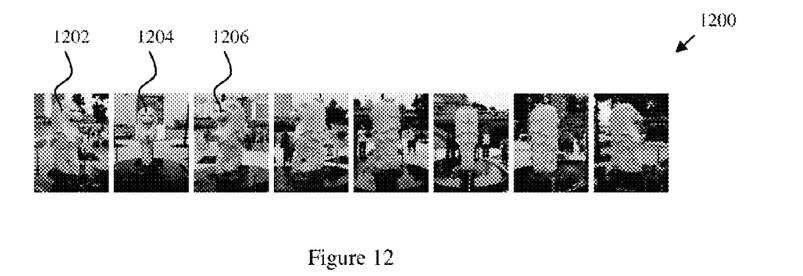
FIG. 12 is a photograph of eight input images from eight different camera positions taken using a consumer camera.
Figure 13:
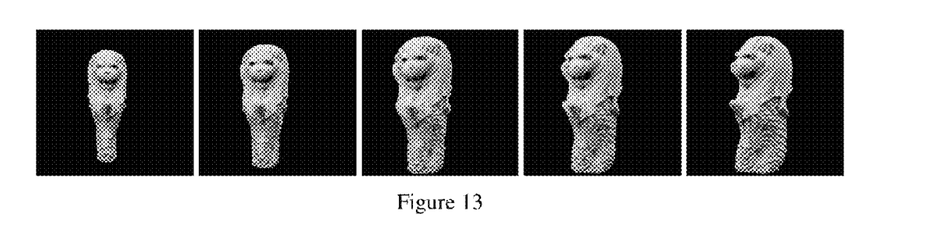
FIG. 13 is a photograph of interpolated images between images from the second and third camera positions after performing the post-processing.

The same post processing can also be applied to the interpolation between free-hand shot images on static objects using a single consumer camera from a plurality of camera positions. One example is the interpolation among the eight images captured with a consumer camera without tripod as shown in FIG. 12. Using user assisted background segmentation and auto-rectification based on features points (e.g. SIFT—Scale Invariant Feature Transformation), interpolation can be done among the plurality of captured images (in this example, 8 images) from different views. Post processing is done to construct a continuous view across all the images. The method of post-processing is capable of coping with the "big-small" effect (as shown between the first 1202 and second 1204, or the second 1204 and third 1206 captured views where the sizes of the camera subject are different) caused by different zoom setting/capturing distance. Interpolated views with the post processing result between the second and third input images are shown in FIG. 13. When viewed on RayModeller, it can be verified that the keystone and size factors are correctly compensate for all interpolated images.

In an alternative embodiment, a "baseline adjustment" can be performed after view interpolation during post-processing. This embodiment may be used with linear camera setups such as that shown in FIG. 2c where the camera image planes for the camera pairs are not so different from each other. The camera positions do not have to be aligned linearly and can for example be aligned in a curve or zig-zag, as long as the camera image planes for the camera pairs do not differ greatly from each other. For such linear or substantially linear setups, this "baseline adjustment" method may generate negligible geometric distortions.

The basic idea is to transform all the "rectification" image planes for each pair of cameras on to a single common plane associated with a designated pair of camera positions e.g. the rectified image plane of the center camera position pair. The common plane will have an axis that is substantially parallel to the linear camera positions.

The "baseline adjustment" method is described next with reference to FIG. 3. In "baseline adjustment", a transformation matrix is applied to all interpolated views except for those from the designated pair, e.g. the center pair consisting of the camera positions 304 and 306. For the results from other pairs, e.g. the pairs consisting of camera positions 302 & 304, and camera positions 306 & 308, the images from these cameras undergo a transformation that puts the images onto the same image plane as that of the "rectification plane" for camera positions 304 & 306. Taking for example the images between camera positions 302 & 304, the transformation matrix is calculated as $H_{2a}^{-1} \times H_{2b}$ and for those between camera positions 306 & 308, the transformation matrix is calculated as $H_{3b}^{-1} \times H_{3a}$.

If there are other cameras further to the left of camera position 302 or further to the right of camera position 308, the transformation matrix can be calculated in a concatenating manner. Taking a camera position pair consisting of the i−1 and i camera positions and where the designated pair consists of the $i_0-1$ and $i_0$ camera positions, if $i<i_0$ i.e. the pair is to the left of the designated camera pair, the transformation matrix is $H_{(i)a}^{-1} \times H_{(i)b}$. If however $i>i_0$ i.e. the pair is to the right of the designated camera pair, then the transformation matrix is $H_{(i)b}^{-1} \times H_{(i)a}$.

In this specification, the terms "camera position" and "camera view" or "view" have been used interchangeably.

It should be appreciated that proposed method may be used for different applications and the described embodiments should not be construed as limitative. For example, they can be used for the processing of medical images (such as CAT scans or ultrasound images), or images generated by radar or sonar. It is also envisaged that the proposed method may be used for the purpose of robotic vision.

Whilst there has been described in the foregoing description embodiments of the present invention, it will be understood by those skilled in the technology concerned that many variations in details of design, construction and/or operation may be made without departing from scope as claimed.

The invention claimed is:

1. A method of image processing comprising acts of:
   receiving an interpolated image having been interpolated from two reference images having different image planes; and
   applying a transformation to the interpolated image to un-rectify the interpolated image onto an intermediate image plane,
   wherein the intermediate image plane is oriented intermediate to the image planes of the two reference images and corresponds to a viewing angle of the interpolated image relative to camera positions corresponding to the reference images, and
   wherein a same camera subject is centered in the interpolated image before and after applying the transformation to un-rectify the interpolated image onto the intermediate image plane.

2. A method according to claim 1, wherein at least one act of applying a transformation comprises:
   obtaining a transformation matrix by multiplying a scaling matrix with a keystone compensation matrix; and
   applying the transformation matrix to the interpolated image.

3. A method according to claim 2, further comprising an act of obtaining the keystone compensation matrix by interpolating between an identity matrix and an inverse of a rectification matrix associated with a first of the camera positions corresponding to a first of the reference images.

4. A method according to claim 3, further comprising an act of selecting the rectification matrix based on a sequence number of the interpolated image.

5. A method according to claim 2, wherein the scaling matrix comprises:
   a translation parameter indicative of an image origin of the interpolated image; and
   a scaling factor indicative of a viewing distance of the interpolated image.

6. A method according to claim 5, further comprising an act of:
   obtaining the translation parameter by interpolating between unity and a center translation parameter obtained from an interpolated image centered among a plurality of images having been interpolated from the two reference images.

7. A method according to claim 5, further comprising an act of:
   obtaining the scaling factor by interpolating between unity and a center scaling factor obtained from an interpolated image centered among a plurality of images having been interpolated from the two reference images.

8. A method according to claim 7, further comprising an act of:
   obtaining a center translation parameter using the center scaling factor.

9. A method according to claim 7, further comprising an act of:
   obtaining the center scaling factor using an angle indicative of a field of view of the centered interpolated image.

10. A method according to claim 6, wherein the center translation parameter is associated with a width of the centered interpolated image.

11. A method according to claim 6, wherein the center translation parameter is associated with a height of the centered interpolated image.

12. A method according to claim 3, wherein the act of receiving the interpolated image comprises:
rectifying an image by transforming the image plane of the image onto a common image plane shared by a plurality of interpolated images.

13. A method according to claim 12, wherein transforming the image plane of the image comprises:
applying the rectification matrix to a first of the reference images corresponding to a first of the camera positions.

14. A method according to claim 1, further comprising an act of:
determining the viewing angle of the interpolated image about the camera subject.

15. A method according to claim 14, further comprising receiving two or more interpolated images in which the camera subject is visible, the two or more interpolated images having been interpolated from the two reference images, the two or more interpolated images including the interpolated image.

16. A method according to claim 15, wherein the two or more interpolated images include a first interpolated image in which the camera subject has a first size, and a second interpolated image in which the camera subject has a second size.

17. A method according to claim 14, wherein the camera subject is visible in the reference images.

18. A method of image processing comprising:
receiving a first interpolated image corresponding to a first image plane, the first interpolated image having been interpolated from images captured from first and second camera positions included in a plurality of camera positions;
receiving a second interpolated image corresponding to a second image plane, the second interpolated image having been interpolated from images captured from third and fourth camera positions included in the plurality of camera positions; and
applying first and second transformations to the first and second interpolated images, respectively, to change the image planes of the first and second interpolated images from the first and second image planes, respectively, to a same reference image plane.

19. A method according to claim 18, wherein the plurality of camera positions are located on a substantially straight line and an axis of the reference image plane is parallel to the substantially straight line.

20. A method according to claim 18 or 19, further comprising an act of: obtaining the first transformation by multiplying an inverse of a first camera specific rectification matrix with a second camera specific rectification matrix, the first and second camera specific rectification matrices being associated with the second and third camera positions, respectively.

21. An integrated circuit or processor configured to perform the method of image processing according to claim 1.

22. An apparatus for capturing images, the apparatus configured to perform the method of image processing according to claim 1.

23. An apparatus for displaying images, the apparatus configured to display a processed image obtained using the method of image processing according to claim 1.

24. An integrated circuit or processor configured to perform the method of image processing according to claim 18.

25. An apparatus for capturing images, the apparatus configured to perform the method of image processing according to claim 18.

26. An apparatus for displaying images, the apparatus configured to display a processed image obtained using the method of image processing according to claim 18.

27. The method of claim 1, wherein the center of the un-rectified image is not co-linear with the camera positions corresponding to the reference images.

28. The method of claim 27, wherein the interpolated image is a first interpolated image, wherein the transformation is a first transformation, wherein the intermediate image plane is a first intermediate image plane, and wherein the method further comprises acts of:
receiving a second interpolated image in which the camera subject is visible, the second interpolated image having been interpolated from the two reference images, and
applying a second transformation to the second interpolated image to un-rectify the second interpolated image onto a second intermediate image plane,
wherein, before applying the first and second transformations to the first and second interpolated images, respectively, a size of the camera subject differs in the first and second interpolated images, and
wherein, after applying the first and second transformations to the first and second interpolated images, respectively, a size of the camera subject is the same in the first and second interpolated images.

* * * * *